United States Patent [19]
Soltys et al.

[11] Patent Number: 5,358,212
[45] Date of Patent: Oct. 25, 1994

[54] POPPET VALVE HAVING EXTERNAL ADJUSTMENT FOR A FLOW RESTRICTOR

[75] Inventors: Gregory B. Soltys, Edinboro; Gregory A. Parkin, Erie, both of Pa.

[73] Assignee: Copes-Vulcan, Inc., Lake City, Pa.

[21] Appl. No.: 134,412

[22] Filed: Oct. 8, 1993

[51] Int. Cl.⁵ .......................... F16K 1/52; F16K 47/08
[52] U.S. Cl. ..................................... 251/121; 251/210
[58] Field of Search .......................... 251/120, 210, 121

[56] References Cited

U.S. PATENT DOCUMENTS

| | | | |
|---|---|---|---|
| 1,730,322 | 10/1929 | Gartin | 251/210 |
| 2,328,010 | 8/1943 | Griswold | 251/120 X |
| 3,164,364 | 1/1965 | McColl | |
| 3,572,631 | 3/1971 | Ritchart | 251/210 |
| 5,135,198 | 8/1992 | Freund et al. | |

*Primary Examiner*—Arnold Rosenthal
*Attorney, Agent, or Firm*—Pearne, Gordon, McCoy & Granger

[57] ABSTRACT

A poppet valve has a flow restrictor downstream of the poppet which is externally adjustable by rotation of the poppet valve stem. The restrictor is in the form of a throttle ring threadedly mounted on a valve guide and the throttle ring has a diameter less than that of the valve port sealed by the poppet so that the assembly of the throttle ring is removable through the valve port while inadvertent removable is prevented by projecting cap screws on the throttle ring extending to a diameter greater than that of the valve port. The valve poppet is also provided with a contour area adjacent the seat which provide a restriction after initial opening movement of the poppet to minimize erosive wear on the poppet sealing surfaces when the pressure drop occurs adjacent these surfaces.

7 Claims, 4 Drawing Sheets

POPPET VALVE HAVING EXTERNAL ADJUSTMENT FOR A FLOW RESTRICTOR

BACKGROUND OF THE INVENTION

This invention relates generally to valves and more particularly to poppet valves which have an internal restrictor which is externally adjustable independently of the operation of the poppet to provide variable rates of fluid flow through the valve when the poppet is fully open.

One application of this type of valve is in sootblowers used for boiler cleaning. Sootblowers used a moving jet of air, water, or most often, steam under high pressure from a moving lance to dislodge combustion deposits from the boiler tubes. As the lance is moved in and out of the various access openings in the boiler, it is necessary that the control valve for the steam supply be able to open and close relatively quickly, yet have a flow adjustment that can be readily made during operation.

It has been found that because of the erosive nature of steam on the valve materials, particularly at a flow restriction needed for such an adjustment, it is desirable to provide the adjustable restriction at a point downstream from the poppet valve. The poppet valve can then be operated on a open and closed basis with a fixed length of travel of the poppet to minimize any erosion at the valve seat and ensure a long life for the poppet and especially the valve seat which is relatively expensive to replace and such replacement may require extensive down time. By using a restrictor member that is separate from the poppet and its sealing function, the restrictor member, where the necessary pressure drop takes place, can be replaced or serviced without removal of the valve seat.

One early valve design particularly adapted for sootblowers is shown in U.S. Pat. No. 3,164,364, granted Jan. 5, 1965. This valve has a poppet actuated by a valve stem which in turn is slidable in a valve guide mounted in the valve body. A valve seat is mounted in the lower portion of the valve body to seal with a valve poppet connected to the end of the stem. Above the valve seat is a restrictor surface which cooperates with another restrictor member threadably engaged on the valve guide and prevented from turning by a pin threaded into the side of the valve body. To adjust the valve, it is necessary to remove the pin and insert a tool to rotate the restrictor member, and therefore, this member is not adjustable while the valve is in operation.

An improvement over the above valve is shown in U.S. Pat. No. 5,135,198, granted Aug. 4, 1992. The layout of this valve is generally similar to the one described above, but in this case, the restrictor member also fits over the valve stem with an engagement between non-circular surfaces. As a result, it is possible with this arrangement to rotate the valve stem, and hence, the restrictor member so that it can move on the threads of the valve guide to and from the restrictor portion of the valve seat. However, the restrictor member can be replaced for servicing only by completely disassembling the valve including removing the valve guide, since the valve seat assembly is welded in place. Thus, while this design allows adjustment of the restrictor without removing the valve from the sootblower, it still does not allow easy replacement of any of the component parts.

SUMMARY OF THE INVENTION

In accordance to the preferred embodiment of the present invention, the valve includes a valve body having an inlet chamber, an outlet chamber, and an integral dividing wall therebetween. As configured for mounting in a sootblower, the inlet opening has a connection flange at the bottom while the outlet opening extends from the side so that the fluid passing through the valve must necessarily make a right angle turn. The dividing wall is parallel to the bottom and has a valve port opening centrally located with a hardened valve seat insert pressed in on the lower side of the wall surrounding the opening. Directly above the opening is mounted a valve guide which is threaded into the top wall and extends downwardly concentric with the valve seat and valve port. A valve poppet has a head on the lower side of the wall adapted to move upward and seal against the valve seat. The valve stem extends upward through the valve guide which is provided with packing at the upper end which can be compressed by a gland bushing threaded into the valve guide. The valve stem extends beyond the gland bushing and through a spring retainer which fits into a slot on the valve stem to support one end of a compression spring whose other end abuts the gland bushing to bias the valve poppet towards the closed position with the head in engagement with the valve seat. The end of the valve stem receives a cap which has wrenching flats on the sides and is secured to the valve stem by a transverse pin.

A throttle ring is threaded on the lower end of the valve guide within the outlet chamber and is generally cup shaped with the side walls having internal threads engaging the external threads on the valve guide. The throttle ring has a transverse lower wall having a non-circular or square opening in the center through which the valve stem passes. In this area, the valve stem has a matching square cross section which fits through the square opening in the throttle ring bottom wall so that as the valve stem is rotated, the throttle ring rotates with it and, because of the threaded connection to the valve guide, moves upwardly and downwardly within the outlet chamber. The throttle ring has a cylindrical outer surface which has a slightly smaller diameter than that of the valve port opening in the valve body wall. Thus, when it is desired to replace the throttle ring, it is necessary only to remove the valve stem cap by pushing out the pin and removing the cap and upper spring retainer, after which the valve poppet can be removed through the bottom of the valve. When the throttle ring is unscrewed from the valve guide, it is then also removable through the valve port opening in the valve wall and the inlet chamber. To prevent this from happening inadvertently, a pair of cap screws extend radially from the throttle ring so that their heads extend outwardly beyond the cylindrical outer surface and prevent the throttle ring from entering the opening in the valve wall and thereby prevent removal of the throttle ring without intentionally removing the cap screws to provide the necessary clearance.

Another feature of the invention is the arrangement for minimizing the erosion from pressure drop during the initial opening of the valve poppet at the valve seat before the throttle ring becomes effective. The valve seat has a flat sealing face and a cylindrical port surface extending upward from the sealing face continuous with the valve port surface formed on the wall of the valve body. The valve poppet, in turn, has a flat face adjacent its outer periphery, and a U-shaped groove is formed on the head at the inside of the valve face. The inner side of the groove extends upward beyond the plane of the valve face to define a contour portion having a cylindrical portion spaced closely from the cylindrical port surface and a fillet extending from the upper edge of the cylindrical portion inwardly to the valve stem.

With this arrangement, after the valve has initially moved off the valve seat, the pressure drop takes place in this contour area and not at the sealing surfaces. As the valve opens further, this contour area increases until the pressure drop is transferred to the throttle ring when the valve is almost fully open, depending upon the setting of the throttle ring. Thus, the damaging pressure drop takes place at the valve face and valve seat only during the initial opening and final closing movements.

The above and other benefits and advantageous of the present invention will readily become apparent to those skilled in the art from the following detailed description of the preferred embodiment taken in conjunction with the accompanying drawings.

BRIEF DESCRIPTION OF THE DRAWINGS

FIG. 1A is a cross sectional view taken on line 1A—1A of FIG. 1;

FIG. 1B is a cross section taken on line 1B—1B of FIG. 1;

DETAILED DESCRIPTION OF THE PREFERRED EMBODIMENT

Figure 1:
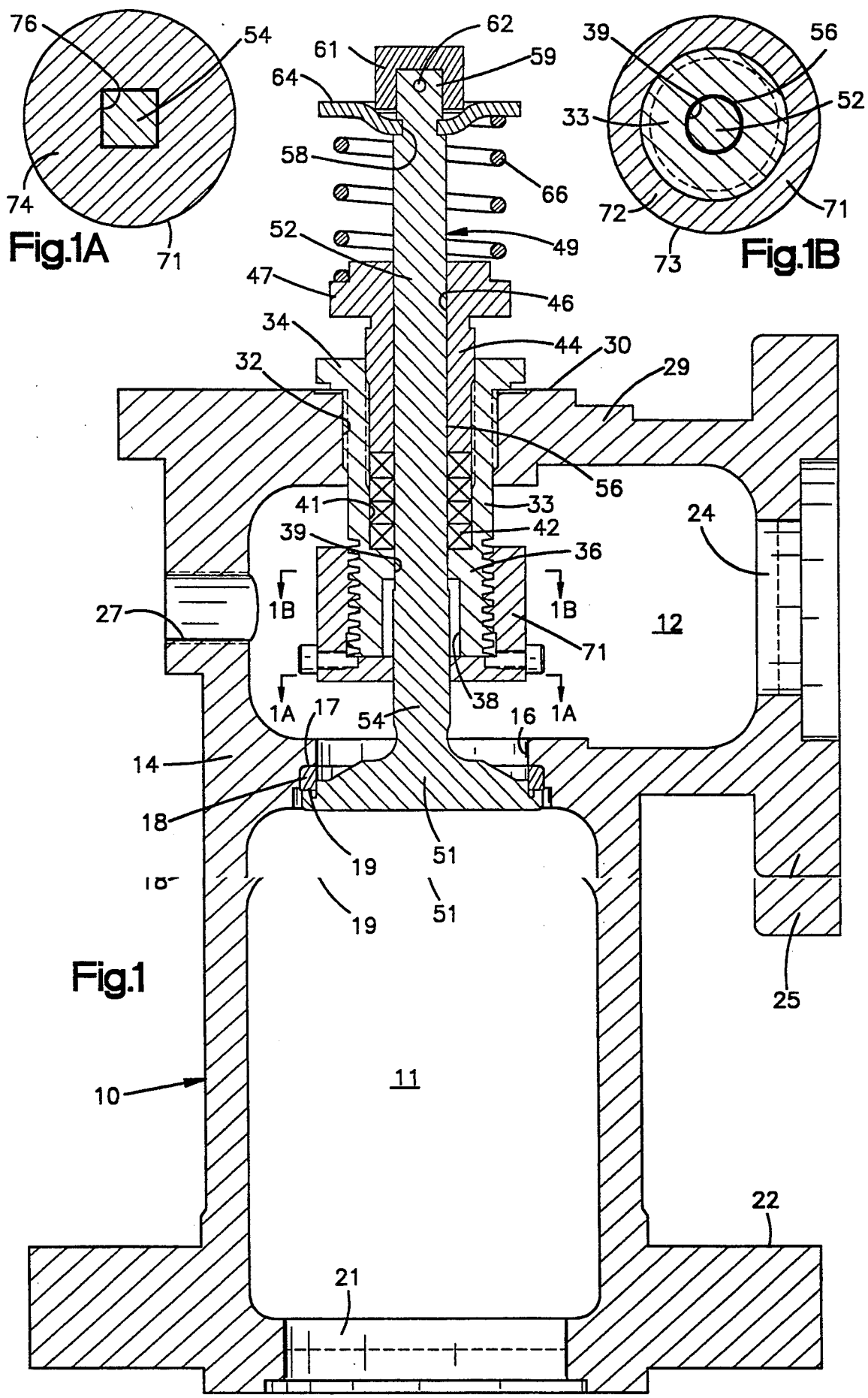
FIG. 1 is an elevational cross section through the poppet valve, showing the valve in the closed position and the restrictor in the maximum flow position.

Referring to the drawings in greater detail, the valve is shown in cross section and will be understood that many features can be varied depending upon the particular application and inlet and outlet connections as well as valve actuation, since these are well known in the art and really form no part of the present invention. The valve is shown as having a valve body or housing 10 generally in the form of a one piece casting having an inlet chamber 11 and an outlet chamber 12 separated by a horizontal dividing wall 14. This dividing wall has a cylindrical valve port opening 16 centrally located therein with a counterbore 17 at its lower end adapted to receive a valve seat insert 18 preferably formed of a suitable wear resistant material. The valve seat insert is pressed in place and provides a flat annular valve seat face 19 on the side exposed in inlet chamber 11. It should be noted that the valve seat insert 18 has the same diameter cylindrical bore 20 as that of valve port opening 16 for reasons explained later in greater detail.

At the lower end, the inlet chamber 11 has an inlet opening 21 together with a connecting flange 22 to make a suitable pipe connection to a source of steam or other blowing agent. Likewise, the outlet chamber 12 has an outlet opening 24 on an extension at its side and this opening is also provided with a flange 25 to make a suitable pipe connection leading to the sootblower or other device supplied by the valve. The housing 10 also has a threaded access opening 27 on the side opposite the outlet opening and this opening is normally closed by threaded pipe plug (not shown). Alternatively, the access opening 27 can be used as a connection to a purge system.

The valve body 10 includes a top wall 29 extending generally parallel to the dividing wall 14 and having an outer surface 30. A threaded opening 32 is formed in the top wall 29 to be in concentric alignment with the valve port opening 16 and serves to mount a threaded valve guide 33 screwed into the opening 32 with an outer flange 34 in abutment with the outer surface 30. The threaded valve guide 33 has a shank end 36 extending downwardly toward the valve port opening 16 and shank 36 includes a lower counterbore 38 above which is a circular guide portion 39 serving to guide the valve stem as explained in greater detail hereinafter. Above the guide portion 39 is a threaded packing counterbore 41 which receives suitable valve packing 42 at its lower end and a threaded gland bushing 44 at the upper end, it being understood that in normal practice the bushing 44 can be rotated and because of its threaded engagement with the valve guide 33 can serve to compress the packing 42 to prevent leakage along the valve stem. Thus, the gland bushing 44 also has an internal bore 46 which provides a guide bearing for the valve stem and has a radially extending flange 47 at its upper end which serves not only as a wrenching surface for rotating the gland bushing 44, but also as a spring seat.

The valve poppet 49 is mounted within the valve body 10 with the head 51 below the valve seat insert 18 and the stem 52 extending upward through the outlet chamber 12, The lower portion of the stem directly above head 51 has a portion 54 that is square in cross section (see FIG. 1A) and above that, the remainder of the stem is round or cylindrical at 56 to extend upward through the guide portion 39 of valve guide 33, through the packing 42 and gland bushing 44 to terminate in a tip 59 which includes an annular groove 58 extending around the periphery. A valve stem cap 61 is fitted over the tip 59 and held in place by a transverse roll pin 62. The cap 61 is preferably provided with wrenching flats on its outer periphery but is prevented from rotating with respect to the tip 59 only by the roll pin 62. Thus, if the valve poppet 49 seizes internally so that it will not rotate about the axis of the stem 52, only a limited amount of torque can be applied through the cap 61 before the roll pin 62 is sheared to allow relative rotation between the cap 61 and tip 59. This prevents damage to the internal structure of the valve, such as might occur if rotation of the poppet is tried when the valve is closed, and thereby prevents any internal damage. Directly below the cap 61 is a flat spring retainer 64 which fits in the annular groove 58 and serves to restrain the valve spring 66 which surrounds the valve stem and engages flange 47 on gland bushing 44. Thus, the spring 66 constantly biases the retainer 64 and hence, the entire valve poppet, upward toward a closed position with the valve head 51 in engagement with the valve seat insert 18.

Figure 2:
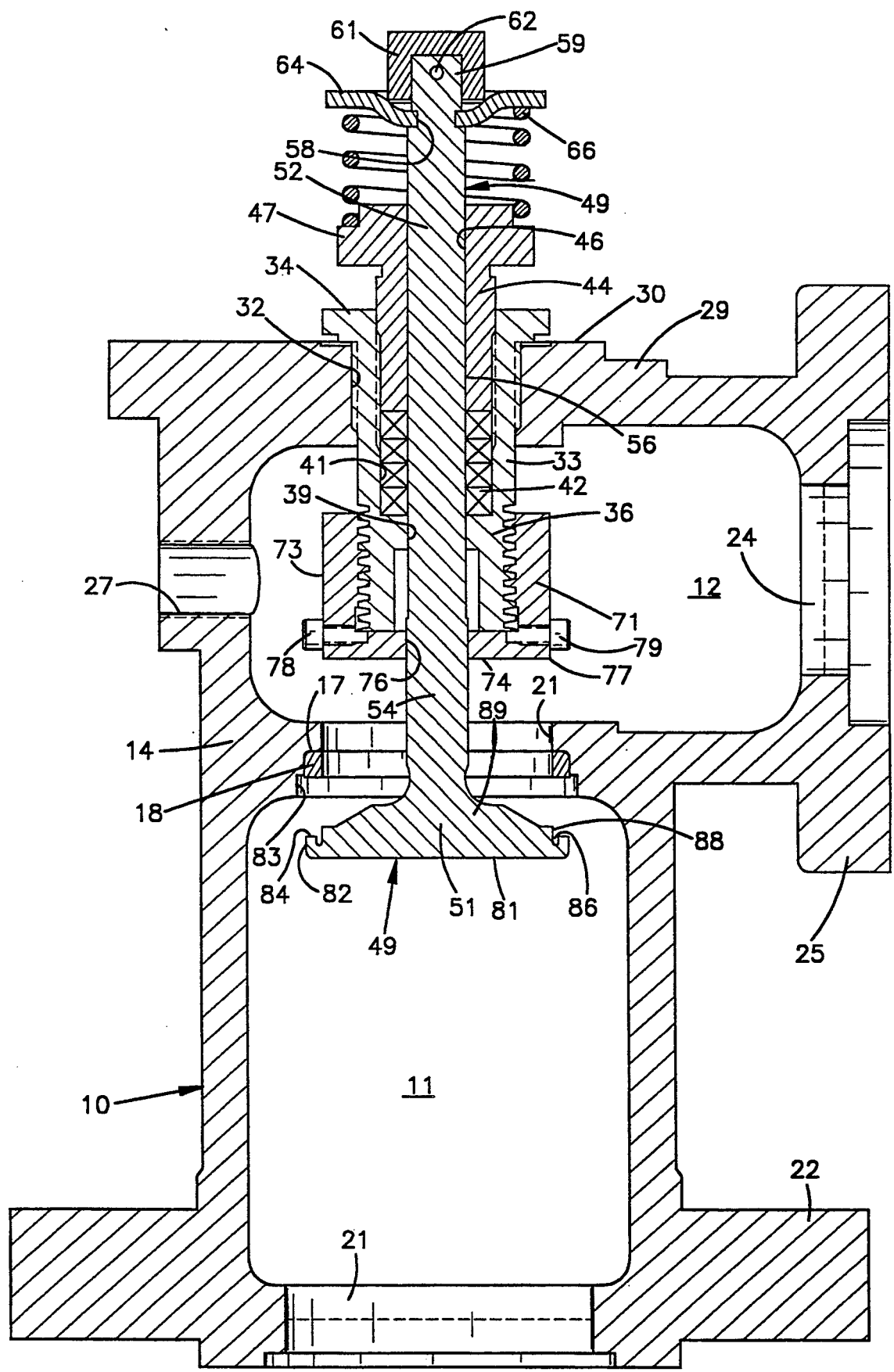
FIG. 2 is an elevational view similar to FIG. 1 but showing the poppet valve in the open position.
Figure 3:
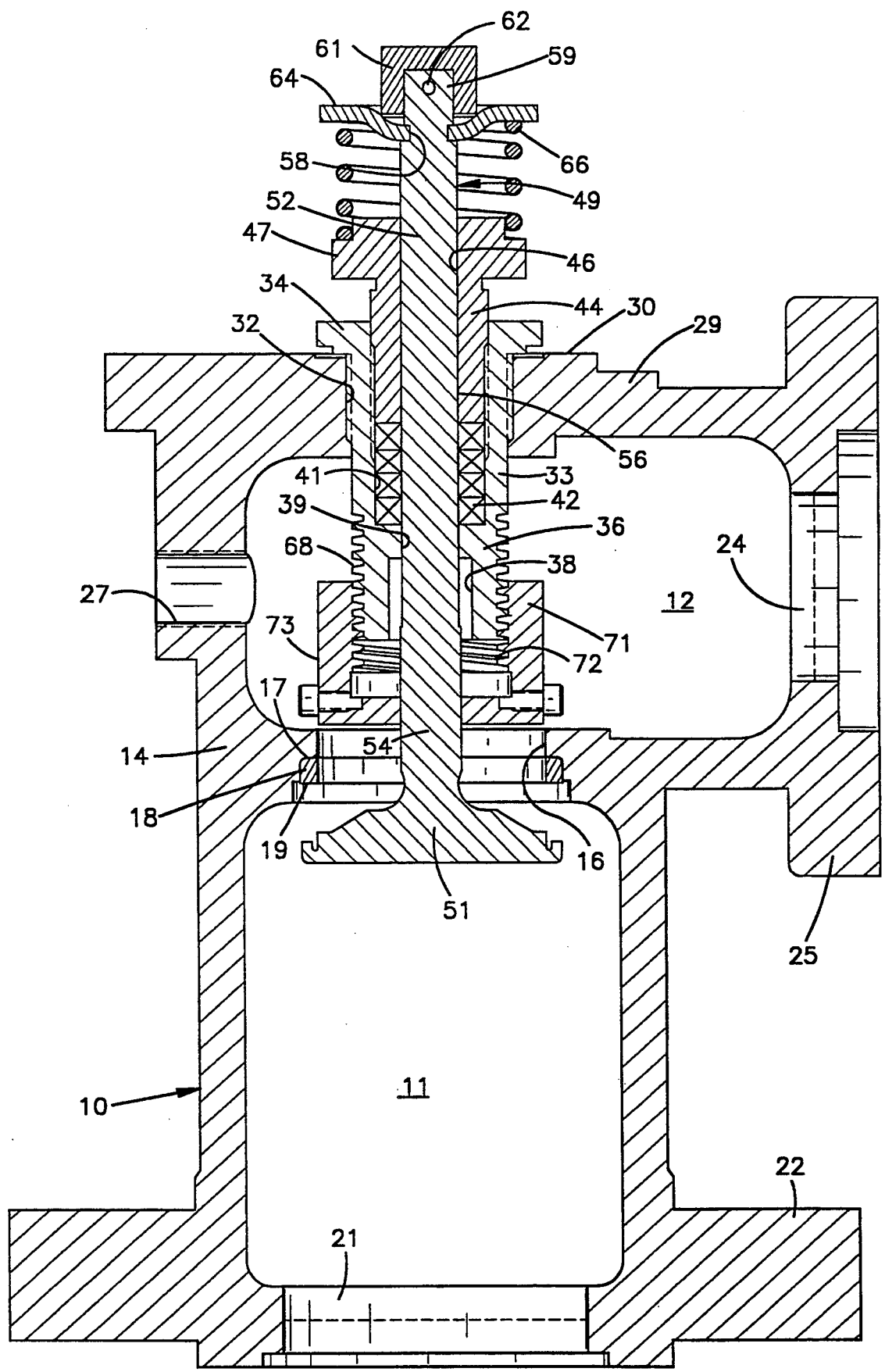
FIG. 3 is an elevational view similar to FIG. 2 with the poppet valve open and the restrictor near a minimum flow position.

The lower end of the valve guide 33 along the shank portion 36 is provided on its external periphery with threads 68 which receive a throttle ring 71 having a threaded sleeve 72 in engagement with the thread 68. The throttle ring 71 has a cylindrical outer surface 73 having a diameter slightly smaller than that of the valve port opening 16 and the inlet opening 21 and this surface terminates at its lower end in a bottom wall 74 extending across the lower end of the valve guide 33 and having a central opening 76 formed as a square to matingly receive the square portion 54 of valve stem 52. Because of this engagement of the square portion 54 and the opening 76, rotation of the valve stem 52 through a wrench applied to the cap 61 will cause the throttle ring 71 to rotate with respect to the valve guide and because of the threaded engagement, the throttle ring 71 can move vertically along the valve guide from the fully opened position as shown in FIGS. 1 and 2 to a fully throttling position as shown in FIG. 3. Thus, when the throttle ring is lowered, the edge 77 between the bottom wall 74 and cylindrical surface 73 moves closer to the valve port opening 16 to define a throttling area which determines the rate of flow through the valve. By having this throttling area less than the area provided between the valve-head 51 and the valve seat insert 18, the pressure drop which causes erosive action takes place between the throttle ring 71 and the valve port opening 16 to prevent damage at the sealing surfaces between the valve poppet and the valve seat face 19.

Figure 4:
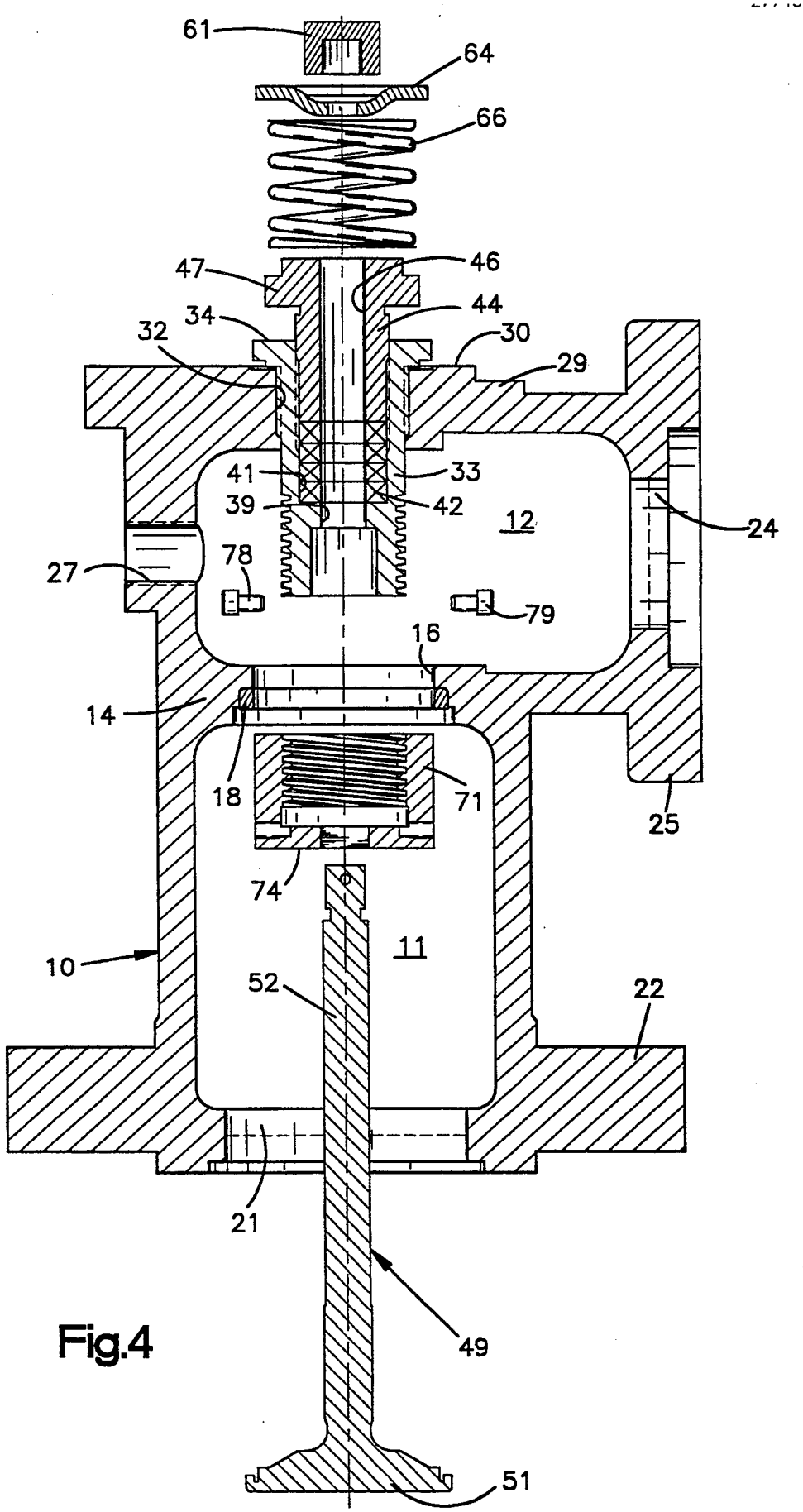
FIG. 4 is an exploded view of the poppet valve.

The throttle ring 71 is provided at its lower end with a pair of cap screws 78 threaded into suitable openings in the outer surface 73 on diametrically opposite sides adjacent the bottom wall edge 77 and these cap screws have projecting heads 79 which extend radially outward to define a diameter greater than that of the valve port opening 16. If the throttle ring is moved downward until the edge 77 passes into the valve port opening 16, the screw heads 79 will engage the top of wall 14 to prevent further downward movement of the throttle ring. Thus, it is not possible by inadvertent rotation of the valve stem 52 to have the throttle ring 71 unscrew completely off the valve guide. However, when it is desired to dissemble the valve it is only necessary to insert a suitable wrench inward through the access opening 27 to remove the two cap screws 78 after which the throttle ring can move down through the valve port opening 16 and the inlet opening 21. When this is done, as shown in FIG. 4, it is first necessary to remove the roll pin 62 and valve stem cap 61 so that the entire valve poppet 49 can be removed through the inlet opening 21.

When the valve is installed in a sootblower or other device, the valve is opened by an actuator which engages the valve stem cap 61 and moves the valve downward until the valve head 51 is far enough off the valve seat to allow maximum flow through the valve. While the valve is open, the valve stem is rotated by turning the valve stem cap 61 until the throttle ring 71 moves far enough downward to reduce the flow through the outlet opening 24 to the desired rate of flow. Since the restriction required to reduce the flow now takes place between the edge 77 of throttle ring 71 and the upper edge of the valve port opening, any erosion caused by pressure drop occurs at these points and not at the sealing faces 19 on the valve seat and at the valve poppet. Since the wear takes place at non sealing portions of the valve, a certain amount of mechanical erosion or metal removal can occur and if large enough, be compensated for by adjustment of the position of the throttle ring 71 without any loss of sealing when the valve is closed.

However, during the initial opening of the valve as the head 51 moves away from the valve seat, flow will begin through the valve and a high pressure drop occur in this area. To limit this, another restriction is brought into play during the initial opening and final closing movements of the valve to limit the time during which the pressure drop might occur at the valve seat face 19. As best seen in FIGS. 2 and 3, the valve head 51 has an end face 81 within the inlet chamber 11, and the end face terminates in a cylindrical periphery 82, which, when the valve is in the closed position, fits within a relief bore 83 formed in the horizontal wall 14 around the valve seat insert 18. A short distance above the end face 81 is an annular flat sealing face 84 adapted to make sealing engagement with the valve seat face 19. There is no conical taper to these sealing faces and they are flat lying entirely in a plane extending normal to the axis of the valve stem 52. At the inward side of the sealing face 84 is a U-shaped groove 86 which provides a slight flexibility to the sealing face 84 to ensure conformity to the valve seat face. The inner side 87 of groove 86 extends upward for a distance beyond the sealing face 84 to terminate in an edge 88 where it joins the valve head fillet 89. Since the side 87 is cylindrical and closely spaced from the valve seat bore 20, the space between the side 87 and the valve seat bore 20 provides a restriction greater than that between the sealing face 84 and the valve seat face 19 after the valve has opened a very short distance and this restriction continues during the opening movement of the valve as the pressure drop in effect is transferred gradually from the space between edge 88 and valve seat bore 20 to the above mentioned spacing at the throttle ring edge 77 depending upon the position of the throttle ring. Thus, pressure drop occurring at the sealing faces 84 and 19 is only minimal during the very initial opening and terminal closing of the valve.

Although the preferred embodiment of this invention has been shown and described, it should be understood that various modification and rearrangement of the parts may be resorted to with departing from the scope of the invention as defined in the claims.

We claim:

1. A valve comprising a valve body having walls defining an inlet chamber and an outlet chamber, said body including a transverse wall separating said inlet and outlet chambers, a valve port opening in said transverse wall, a valve seat on said transverse wall extending around said valve port in said inlet chamber, a valve guide secured in said valve body wall and extending therethrough into said outlet chamber in axial alignment with said valve seat and normal to the plane of the valve seat, said valve guide also extending to the exterior of said valve body and defining an axially extending valve guide bore, a valve poppet having a valve head in said inlet chamber sealingly engageable with said valve seat, said valve poppet having a valve stem extending through said valve guide bore and having an end a spaced distance beyond the exterior of said valve body, cap means secured to said valve stem end, spring means extending around the exterior portion of said valve stem and engageable with said cap means to bias said valve poppet to the closed position with said valve head in sealing engagement with said valve seat, said valve guide having screw threads on the exterior of the end portion adjacent said valve seat, a circular throttle ring threadedly engaged on said valve guide so that relative rotation between said throttle ring and said valve guide moves said throttle ring toward and away from said valve port opening, said throttle ring having an outer surface with a diameter less than the diameter of said valve port opening, said throttle ring having an end wall extending around said valve stem with a noncircular opening therethrough, said valve stem having a mating noncircular portion adjacent said end wall whereby rotation of said valve poppet moves said throttle ring toward and away from said valve port opening, and at least one removable projection on said throttle ring operable to prevent movement of said throttle ring through said valve port opening.

2. A valve as set forth in claim 1 wherein said removable projection is a cap screw.

3. A valve as set forth in claim 1, including a pair of removable projections, one each on diametrically opposed portions of said throttle ring outer surface.

4. A valve as set forth in claim 3 wherein said removable projections are cap screws.

5. A valve comprising a valve body having walls defining an inlet chamber and an outlet chamber, said body including a transverse wall separating said inlet and outlet chambers, a valve port opening in said transverse wall, a valve seat on said transverse wall extending around said valve port in said inlet chamber, said valve having a main restriction to fluid flow downstream of said valve port, a valve guide secured in said valve body wall and extending therethrough into said outlet chamber in axial alignment with said valve seat and normal to the plane of the valve seat, said valve guide defining an axially extending valve guide bore, a valve poppet having a valve head in said inlet chamber, said valve poppet having a valve stem extending through said valve guide bore and defining a valve axis, said valve head having a sealing surface making sealing engagement with said valve seat when said valve is closed, said valve head and valve seat sealing surfaces being flat and in a plane normal to said valve axis, said poppet having a contour surface extending between said sealing surface and said valve stem, said contour surface cooperating with said valve port to provide a restriction to fluid flow through said valve when said valve head is moved more than a predetermined distance from said valve seat so that any pressure drop between said inlet and outlet chambers takes place at said restriction between said contour surface and said valve port, said pressure drop taking place between said valve head sealing surface and said valve seat when said valve head is spaced from said valve seat less than said predetermined distance.

6. A valve as set forth in claim 5, wherein said valve port and a portion of said contour surface are cylindrical so that the movement of said valve head past said predetermined distance provides no change in said restriction for a further predetermined distance of movement.

7. A valve as set forth in claim 5 wherein said main restriction is an adjustable throttle ring threaded on said valve guide.

* * * * *